(12) United States Patent
Smith (10) Patent No.: US 6,944,618 B2
(45) Date of Patent: Sep. 13, 2005

(54) METHOD, COMPUTER PROGRAM PRODUCT, AND SYSTEM FOR UNLOADING A HIERARCHICAL DATABASE UTILIZING SEGMENT SPECIFIC SELECTION CRITERIA

(75) Inventor: Alan R. Smith, Gilroy, CA (US)

(73) Assignee: International Business Machines Corporation, Armonk, NY (US)

(*) Notice: Subject to any disclaimer, the term of this patent is extended or adjusted under 35 U.S.C. 154(b) by 503 days.

(21) Appl. No.: 10/053,442

(22) Filed: Nov. 2, 2001

(65) Prior Publication Data

US 2003/0088572 A1 May 8, 2003

(51) Int. Cl.[7] ............................................. G06F 17/30
(52) U.S. Cl. ................................... 707/100; 707/1
(58) Field of Search ........................... 707/1–3, 100

(56) References Cited

U.S. PATENT DOCUMENTS

| | | | | |
|---|---|---|---|---|
| 5,455,945 A | * | 10/1995 | VanderDrift | 707/2 |
| 5,761,667 A | * | 6/1998 | Koeppen | 707/101 |
| 5,933,820 A | * | 8/1999 | Beier et al. | 707/1 |
| 6,141,664 A | | 10/2000 | Boothby | 707/201 |
| 6,212,529 B1 | | 4/2001 | Boothby et al. | 707/201 |
| 6,606,640 B2 | | 8/2003 | Smith | |
| 6,622,142 B1 | * | 9/2003 | Murray et al. | 707/100 |

OTHER PUBLICATIONS

Alan R. Smith; Application #: 09/893,381, filed Jun. 26, 2001, Pat. No. 6,606,640 Aug. 2003.

IMS Fast Path Online Tools for z/OS, *User's Guide*, Version 2 Release 1, Publication No. SC27–1184–00. International Business Machines Corporation, First Edition, Softcopy only, Jul. 2001.

* cited by examiner

*Primary Examiner*—Greta Robinson
*Assistant Examiner*—Cheryl Lewis
(74) *Attorney, Agent, or Firm*—Gregory M. Plow (57) ABSTRACT

An unload of a hierarchical database may be performed utilizing a segment specific selection criteria. A segment specific selection criteria is received wherein the criteria comprises a global directive and a set of segment directives. The database definition for the hierarchical database is read and then a logical processing map is built utilizing at least the global directive, the set of segment directives and the database definition. A segment is read from the hierarchical database and then, if the segment has a type identified by the logical processing map and is not an excluded root segment, it is written to a target unload file.

30 Claims, 8 Drawing Sheets

SEGMENT DIRECTIVE EXAMPLE

| SEGMENT CODE 410 | SEGMENT LEVEL 420 | PARENT CODE 430 | SEGMENT TYPE 440 | SEGMENT DIRECTIVE 450 |
|---|---|---|---|---|
| 1 | 1 |  | SEGMENT1 | INCLUDE |
| 2 | 2 | 1 | SEGMENT2 | EXCLUDE |
| 3 | 2 | 1 | SEGMENT3 |  |
| 4 | 2 | 1 | SEGMENT4 | EXCLUDE |
| 5 | 2 | 1 | SEGMENT5 |  |

|  | 550 INCLUDE | 555 SKIP | 560 "NULL" |
|---|---|---|---|
| 520 INCLUDE | INCLUDE | EXCLUDE | INCLUDE |
| 525 EXCLUDE | INCLUDE | EXCLUDE | EXCLUDE |
| 530 "NULL" | INCLUDE | EXCLUDE | INCLUDE |

SEGMENT DIRECTIVE

GLOBAL DIRECTIVE

METHOD, COMPUTER PROGRAM PRODUCT, AND SYSTEM FOR UNLOADING A HIERARCHICAL DATABASE UTILIZING SEGMENT SPECIFIC SELECTION CRITERIA

FIELD OF INVENTION

The present invention relates generally to the management of hierarchical databases, such as Information Management System (IMS) databases, in data processing systems. (IMS is a trademark of International Business Machines Corporation in the United States, other countries, or both.) More specifically, the present invention relates to a method, program product and apparatus to assist database administrators in managing hierarchical databases requiring various management tasks such as replication, backup, restore, mass update, mass insert or merge operations.

BACKGROUND

IMS is a hierarchical database management system (HDBMS) developed by International Business Machines Corporation. IMS has wide spread usage in many large enterprises where high transaction volume, reliability, availability and scalability are of the utmost importance. IMS provides base software and interfaces for running the businesses of many of the world's large corporations. However, companies incorporating IMS databases into their business models typically make significant investments in IMS application programs in order to have IMS perform meaningful data processing work particularly tailored to the needs of their respective enterprises. IMS application programs are typically coded in COBOL, PL/I, C, PASCAL or assembly language. These application programs perform IMS database functions by making Data Language One (DL/I) calls to invoke needed IMS processing.

An application program may be custom developed by a company for its exclusive use on a particular IMS system. However, there is a different class of application programs known in the art as a tools, utilities, or utility programs (henceforth referred to as utilities). These utilities are frequently developed by a software provider to perform tasks that are common in many IMS installations, thereby saving a significant amount of work otherwise expended in developing custom applications to perform very common tasks. For example, unloading and reloading IMS databases for the purposes of backup/recovery or database reorganization are examples of very common tasks for which numerous unload/reload utilities are currently available.

The use of these utilities may save significant time when compared to the laborious process of developing comparable custom application programs. However, the unload/reload utilities briefly discussed above have limitations which may require the use of custom applications, or custom programmed exit routines used in conjunction with the unload/reload utilities whenever segment specific selection criteria must be utilized. Custom programming may cause additional time delays and increased expense for programmer development when compared to the efficiency and convenience of utilizing standard "off the shelf" utilities. Furthermore, these custom applications or programming exits may require additional computing resources and impact the performance of the data processing system on which these database operations are performed.

Database operations that may encounter this form of limitation include merge, replication, mass update and mass insert from a source database to a target database where only a selected subset of the segments in the source database are to be utilized. Whenever this form of limitation is encountered, the enterprise may be forced to embark on expensive and time consuming custom database application programming endeavors to accomplish the needed database operations and the performance, efficiency and cost advantages normally associated with the use of "off the shelf" unload/reload utilities may be lost.

Accordingly, there is a need for an IMS unload utility that can facilitate a variety of database management tasks, including mass insert, mass update, database replication, database merge, database consolidation, database recovery and the like where only a selected subset of segments in the source database are to be utilized. It is highly desirable to enhance programmer productivity in the accomplishment of these tasks, as well as improve the processing efficiency of the computing system on which they are performed.

SUMMARY OF THE INVENTION

To overcome the limitations in the prior art briefly described above, the present invention provides a method, computer program product, and system for performing an unload operation on a hierarchical database utilizing segment specific selection criteria.

An unload of a hierarchical database may be performed utilizing a segment specific selection criteria. A segment specific selection criteria is received wherein the criteria comprises a global directive and a set of segment directives. The database definition for the hierarchical database is read and then a logical processing map is built utilizing at least the global directive, the set of segment directives and the database definition. A segment is read from the hierarchical database and then, if the segment has a type identified by the logical processing map and is not an excluded root segment, it is written to a target unload file.

In another embodiment of the present invention, the above-described database unload method may be provided as a computer system. The present invention may also be tangibly embodied in and/or readable from a computer-readable medium containing program code (or alternatively, computer instructions.) Program code, when read and executed by a computer system, causes the computer system to perform the above-described method.

In this manner, a selected subset of the segments in a source hierarchical database can be easily directed to a target unload file and utilized to achieve many common database management tasks with enhanced programmer productivity, reduced cost and improved processing efficiency.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples of preferred embodiments in accordance with the present invention.

BRIEF DESCRIPTION OF THE DRAWINGS

The preferred embodiments of the present invention will hereinafter be described in conjunction with the appended drawings, where like reference numbers denote the same element throughout the set of drawings.

DESCRIPTION OF THE PREFERRED EMBODIMENTS

The preferred embodiment in accordance with the present invention is directed to a system, computer program product, and method for performing hierarchical database unload operations utilizing segment specific selection criteria. The following description is presented to enable one of ordinary skill in the art to make and use the present invention and is provided in the context of a patent application and its requirements. Various modifications to the preferred embodiment will be readily apparent to those skilled in the art and the teaching contained herein may be applied to other embodiments. Thus, the present invention should not be limited to the embodiments shown but is to be accorded the widest scope consistent with the principles and features described herein.

Figure 1:
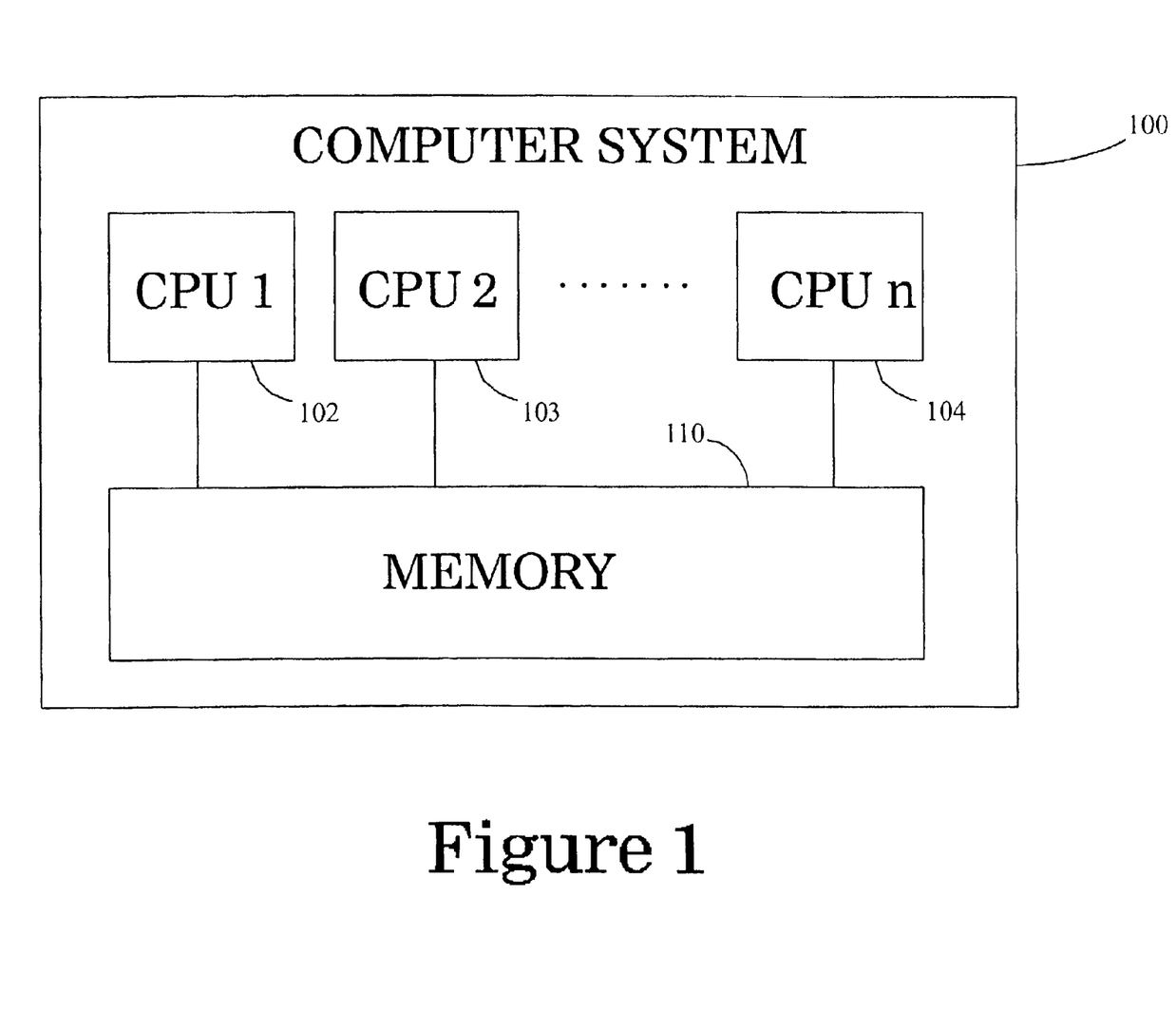
FIG. 1 is a block diagram of a typical computer system wherein the present invention may be practiced.

FIG. 1 is a block diagram of a computer system 100, such as the S/390 mainframe computer system. (S/390 is a registered trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the preferred embodiment is described in a particular hardware environment, those of ordinary skill in the art will recognize and appreciate that this is meant to be illustrative and not restrictive of the present invention. Accordingly, other alternative hardware environments may be used without departing from the scope of the present invention.

Figure 2:
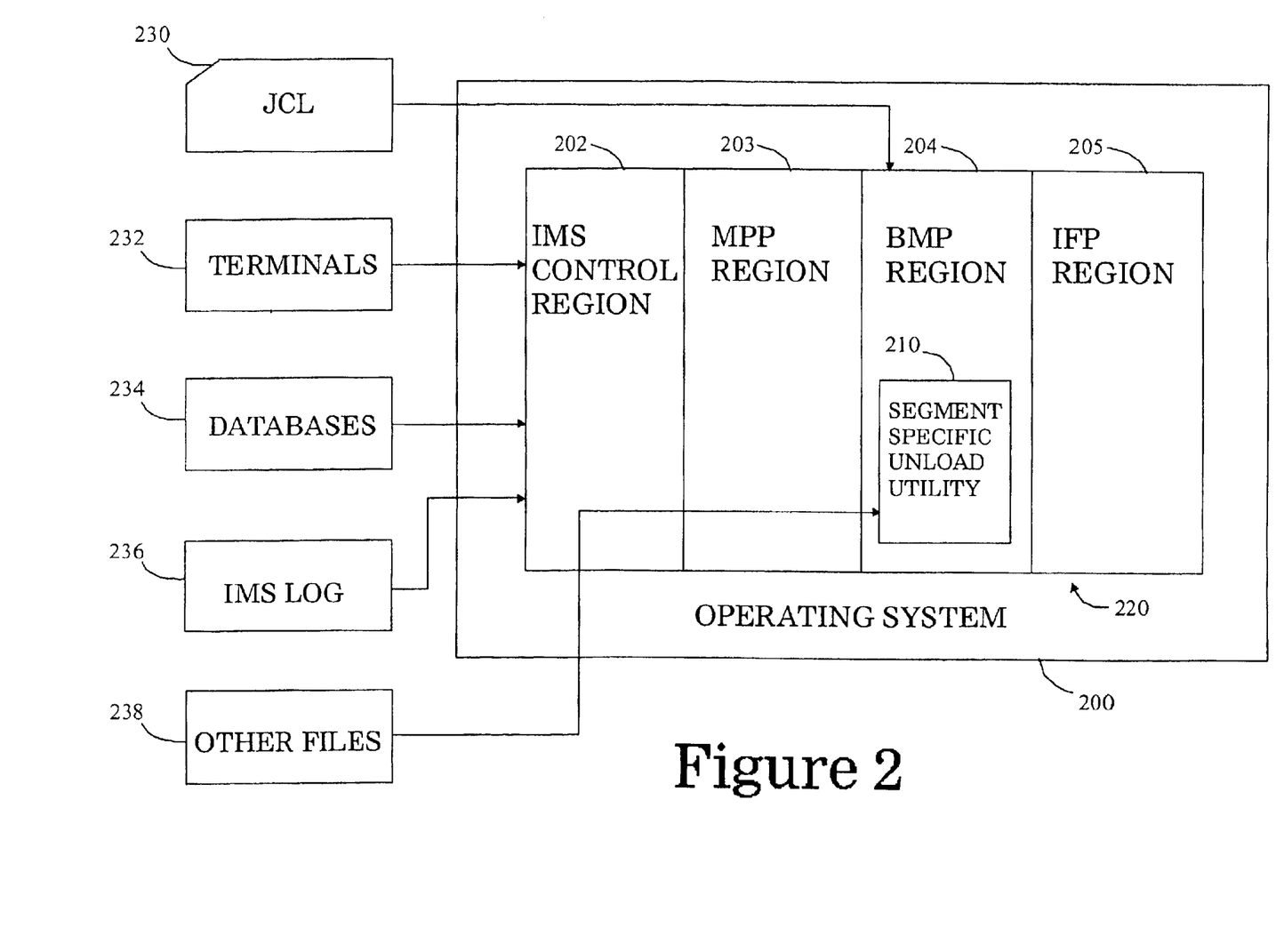
FIG. 2 is a block diagram of an exemplary IMS subsystem including an unload utility in accordance with one embodiment of the present invention.

Referring now to FIG. 2, a block diagram is shown illustrating an exemplary operating system 200, such as the MVS/ESA operating system, suitable for managing the resources of computer system 100 and providing the framework for running other computing subsystems and application programs. (MVS/ESA is a trademark of International Business Machines Corporation in the United States, other countries, or both.) Subsystems functionally capable of being provided under the MVS/ESA operating system include the IMS subsystem 220. The IMS subsystem 220 comprises an IMS control region 202, which manages the region resources comprising Message Processing Program (MPP) region 203, Batch Message Processing (BMP) region 204, and Interactive Fast Path (IFP) region 205. Other resources that communicate with, or are managed by, IMS subsystem 220 comprise terminals 232, databases 234, logs 236, control files 238 and job control language (JCL) 230. Databases 234 may comprise several different types of IMS databases, such as DEDB, HDAM, HIDAM and HISAM.

BMP region 204 is eligible for running utilities in accordance with the preferred embodiment. BMP region 204 comprises an unload utility 210 which is capable of utilizing segment specific selection criteria (hereinafter referred to as a segment specific unload utility). Segment specific unload utility 210 is invoked as a BMP batch application program via JCL 230. Other files 238 (explained in more detail below in conjunction with FIG. 3) provide additional input and direction to segment specific unload utility 210. Those of ordinary skill in the art will recognize that FIG. 2 is exemplary in nature and that many other IMS subsystem configurations are possible within the scope of the present invention. For example, in an alternative configuration, IFP region 205 need not exist and other regions, such as an IMS DLI or DBB region, could exist. Further, segment specific unload utility 210 may run as a DLI/DBB under operating system 200 wherein regions 202–205 need not be present at all.

Generally, segment specific unload utility 210 is tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
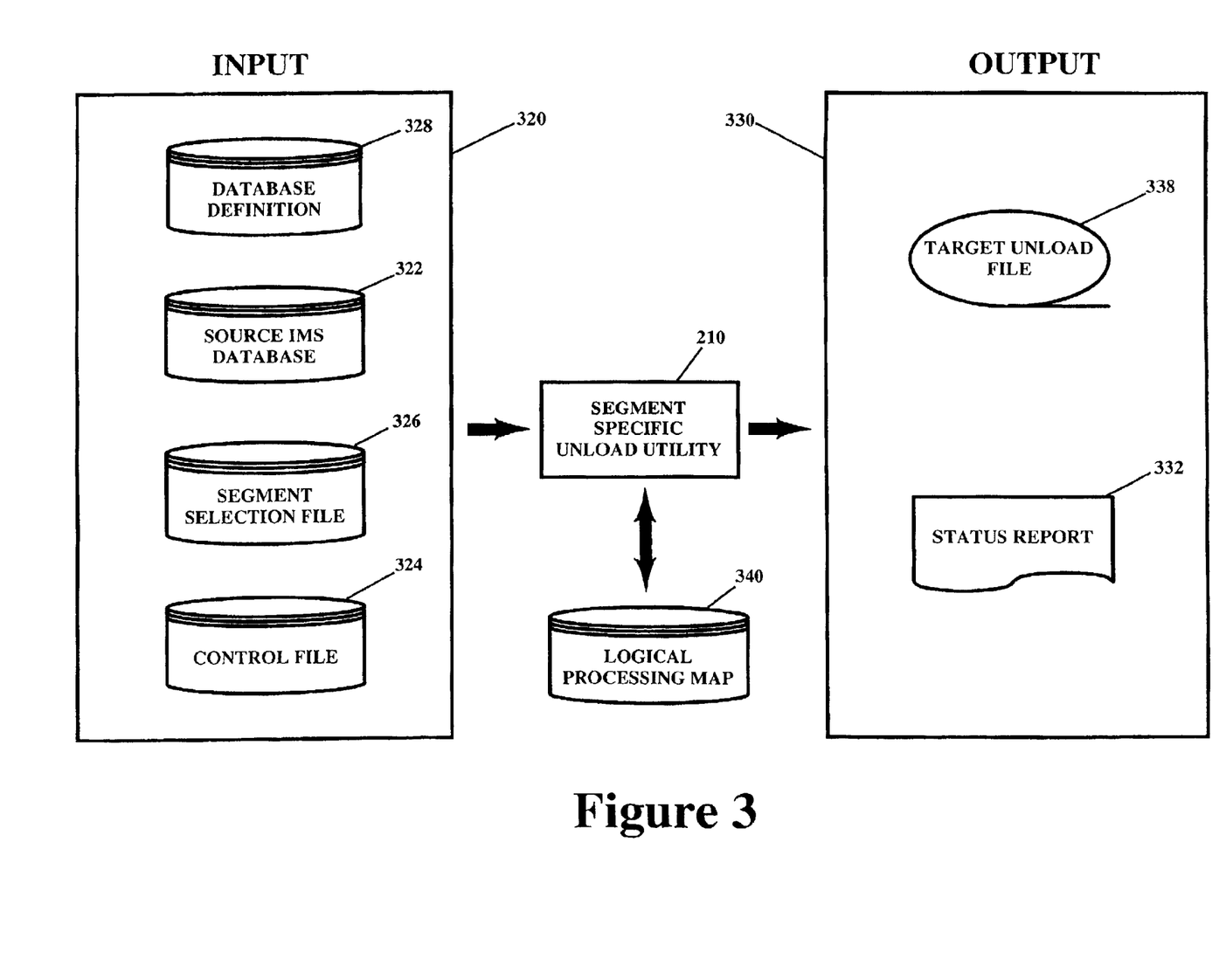
FIG. 3 is an input/output diagram illustrating unload processing in accordance with the preferred embodiment of the present invention.

Referring now to FIG. 3, an input/output diagram 300 is shown. Segment specific unload utility 210 processes input 320 and generates output 330. Input 320 comprises a source IMS database 322, control file 324, segment selection file 326, and database definition information 328. Source IMS database 322 comprises hierarchical data in the form of IMS segments to be processed by utility 210.

Control file 324 contains options and attributes that are directed to the overall unload operation and, absent conflicting attributes at the segment level, are operative for all segments to be processed by segment specific unload utility 210. These attributes include a global directive which, in the preferred embodiment, take the form of either an INCLUDE directive or an EXCLUDE directive. This global directive is further discussed in conjunction with FIG. 5 below.

Figure 5:
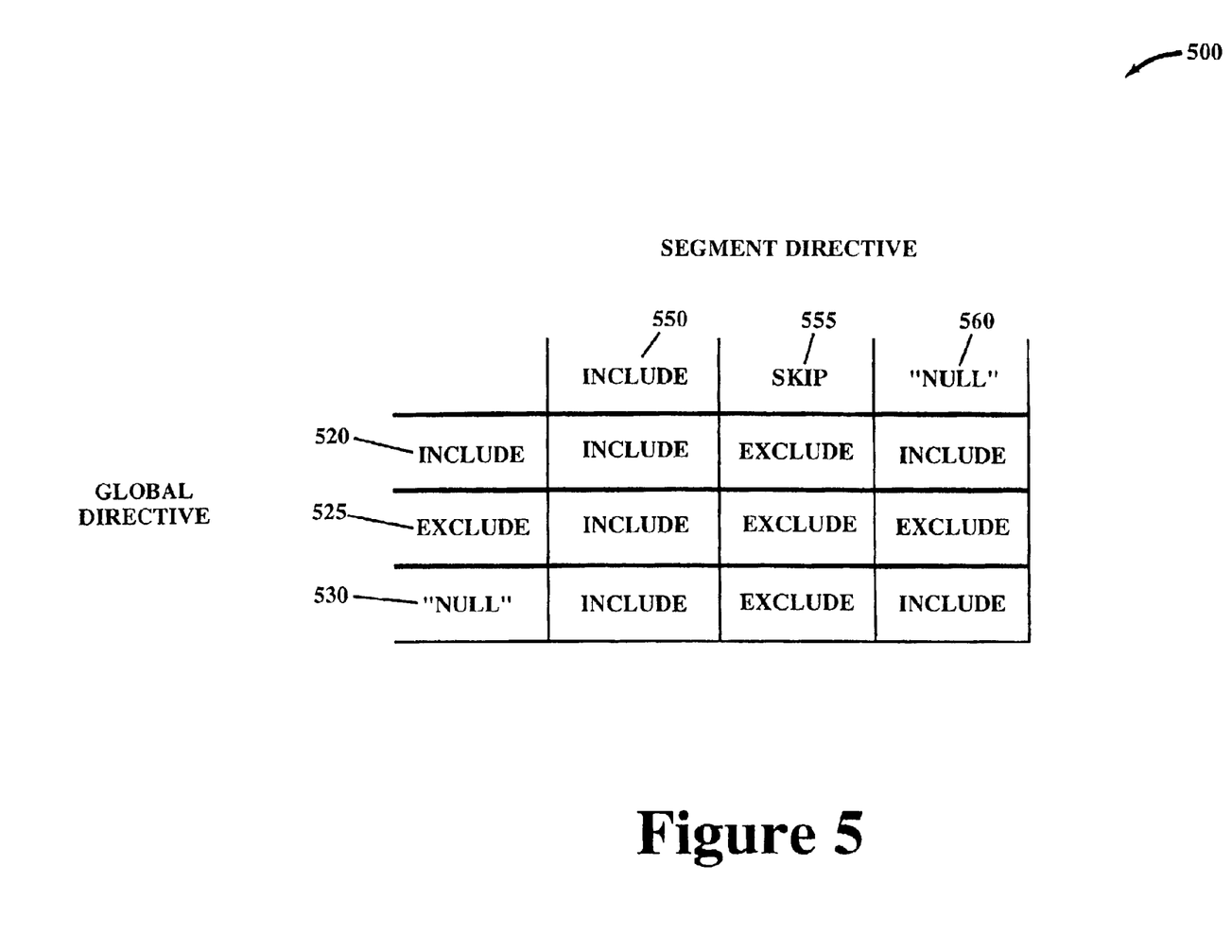
FIG. 5 is a table illustrating the interaction of a global directive and a segment directive.

Segment selection file 326 is optional but when provided, and identified by control file 324, comprises a set of segment directives which, in the preferred embodiment, take the form of one or more segment types, wherein each segment type is associated with either an INCLUDE directive or an EXCLUDE directive. These segment directives, which are further explained below in conjunction with FIG. 5, are operative only for IMS segments having the specified segment type. Segment selection file 326 may also optionally contain an inclusive key list comprising a list of keys specifying which root segments to unload. Inclusive key lists are further explained below in conjunction with FIG. 8. Taken in combination, the global directive, set of segment directives and optional inclusive key list comprise a segment specific selection criteria.

Although segment selection file 326 is shown as a separate file, those of ordinary skill in the art will recognize that segment selection file 326 could be incorporated into control file 324. Further, those of ordinary skill in the art will recognize that some or all of the information contained in control file 324 and segment selection file 326 may be made available to segment specific unload utility 210 in a variety of other ways, such as JCL 230.

Database definition information 328 describes the hierarchical roadmap of the database to be unloaded, wherein the hierarchical relationship between segment types is defined. Those of ordinary skill in the art will recognize that this information may be obtained from a variety of sources including, for example, the Database Definition (DBD), the Application Control Block (ACB) or from information captured and generated during previous processing of a hierarchical database.

Utilizing input 320, segment specific unload utility 210 creates logical processing map 340 to be utilized during unload processing. Logical processing map 340 identifies the eligible segment types that may be written to target unload file 338, described in greater detail below in conjunction with FIG. 7.

Output 330 comprises report 332 and target unload file 338. Report 332 provides valuable information to the user of segment specific unload utility 210 pertaining to the status of the execution. Report 332 may contain varied information such as diagnostic messages, statistics and utility execution status. Target unload file 338 is the target sequential file to receive the unloaded segments from source IMS database 322 during unload processing.

Figure 4:
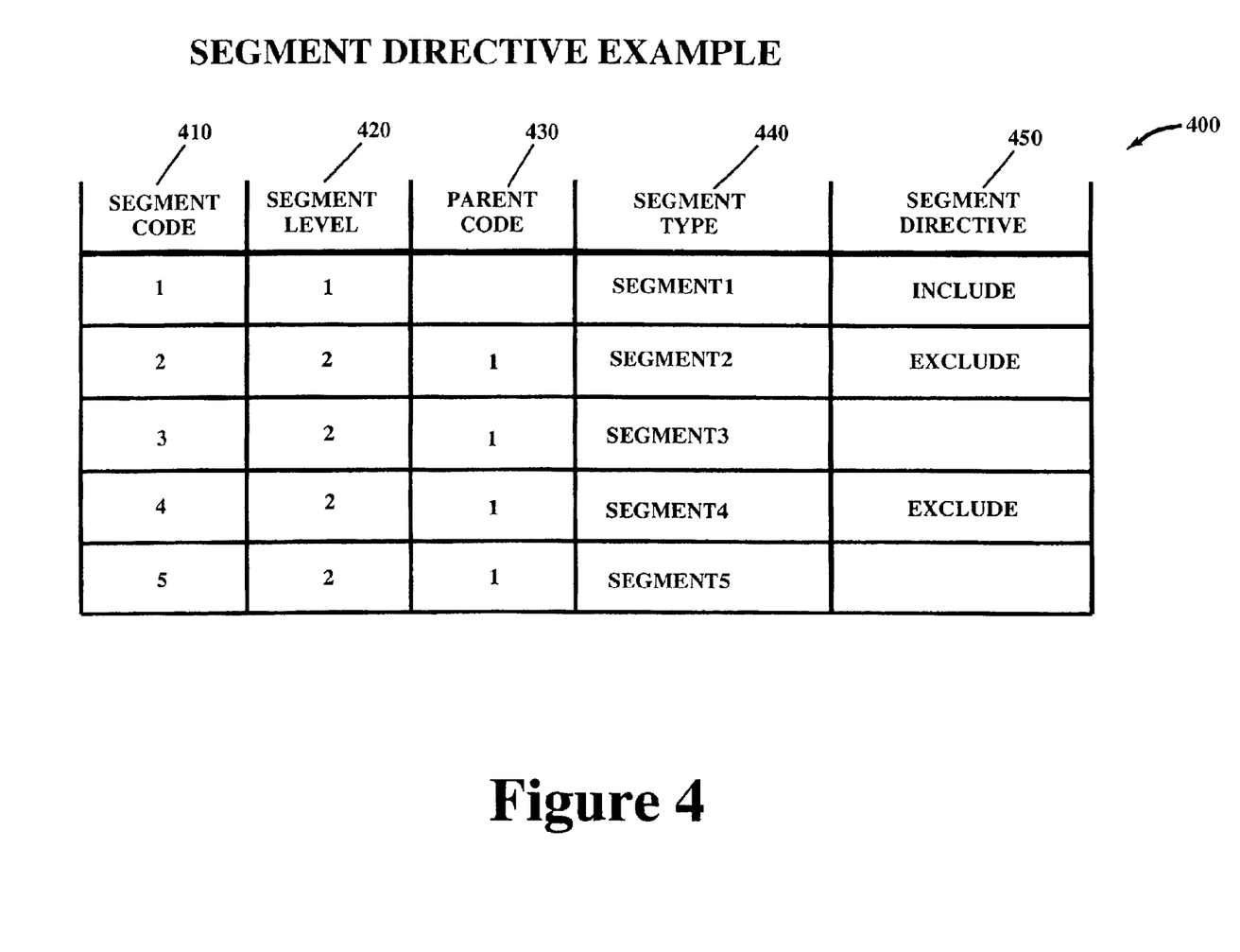
FIG. 4 is an example of a set of segment directives.

Referring now to FIG. 4, an example of a set of segment directives 400 contained within segment selection file 326 is shown. Segment code 410 is the unique code identifier for the associated segment assigned to every segment type by IMS. Segment level 420 identifies the hierarchical level of the associated segment within the IMS database hierarchy wherein the root segment has a level of 1 and the deepest level within the hierarchy has a level of n wherein n is the number of levels within the IMS database hierarchy. Parent code 430 specifies the segment code for the immediate parent of the associated segment. Segment type 440 (also referred to as segment name) is the name of the segment as defined by the database administrator that established the IMS database. Segment directive 450 specifies the particular segment specific action to be taken for segments having the associated segment type. These Segment directives are further described below in conjunction with FIG. 5. FIG. 4 is intended to be exemplary and it is understood that various other formats with more or less information may also comprise a set of segment directives.

Since directives may be specified by the user of segment specific unload utility 210 as either global directives, segment directives, or both, it is necessary for segment specific unload utility 210 to determine a singular effective directive that will be in effect for the processing of each segment type within the source IMS database 322. Referring now to FIG. 5, table 500 specifies the processing to be performed for all combinations of global and segment directives. Any combination of a global and segment directive has a singular effective directive that is found by obtaining the intersecting cell from table 500 utilizing the column and row corresponding to the specified global and segment directives.

Table 500 describes the interaction between a global directive 520–530 and a segment directive 550–560 wherein, for each segment type to be processed, a single effective directive is determined. A global directive represents a global bias and accordingly applies to every segment type processed by segment specific unload utility 210 not otherwise explicitly covered by a segment directive; whereas a segment directive applies only to a segment having the specific IMS segment type associated with the segment directive. The effective directive to be utilized for the processing of a given segment type is determined by finding the intersecting cell for the specified global directive and corresponding segment directive. Once the effective directive is selected, this information is captured in logical processing map 340 (as described below in conjunction with FIG. 7) and processing proceeds in accordance with the following definitions for EXCLUDE and INCLUDE.

The EXCLUDE directive specifies that segment specific unload utility 210 should exclude each IMS segment of corresponding type from target unload file 338 and proceed to read the next database segment from source IMS database 322 in logical sequence. Logical sequence for a hierarchical database means first proceeding top down in the hierarchy and then processing left to right, in a conventional manner known to those of ordinary skill in the art of hierarchical database technology.

In like manner, the INCLUDE directive specifies that segment specific unload utility 210 should include each IMS segment of corresponding type by writing each segment to target unload file 338 prior to retrieving the next database segment from source IMS database 322 in logical sequence.

The "Null" directive 530, 560 is not an actual directive but rather is used in table 500 to represent the case where a directive, global or segment level, was not explicitly specified. As can be seen in table 500, a non-specification for a global directive or segment directive (or both) results in an intersecting cell with an effective directive of either INCLUDE or EXCLUDE.

While table 500 explicitly specifies the processing for all combinations, the derivation of table 500 results from a few simple rules. First, an explicit segment directive always takes priority over any global directive. This rule provides the user of segment specific unload utility 210 with the ability to easily specify the processing to be performed on most segments, with the capability of specifying the minority of exception cases via explicit specification of the segment directives. This rule becomes evident by observing that all entries for any column, excluding only the "NULL" column, are identical implying that it is the explicit segment directive that prevails over the global directive when any conflict of directives for a particular segment type occurs.

Second, wherever a segment directive has not been specified (the column beneath the "NULL" 560 heading) the processing to be performed by segment specific unload utility 210 is governed by the global directive specification. This rule becomes evident by observing that all entries beneath the "NULL" 560 heading reflect the action of the global directive in the corresponding row.

Third, for each segment without a corresponding global directive and segment directive (i.e. "null"/"null" intersect from table 500), the default directive for segment specific unload utility 210 is INCLUDE, as discussed supra. While table 500 explicitly specifies processing for all combinations of global and segment directives, those of ordinary skill in the art will recognize that variations for table 500 are possible. For example, in another embodiment of the present invention, the "null/null" cell from table 500 may specify that a segment in source IMS database 322 is to be excluded and the user, in being apprised of the default actions, adjusts his input appropriately to achieve the desired results.

Figure 6:
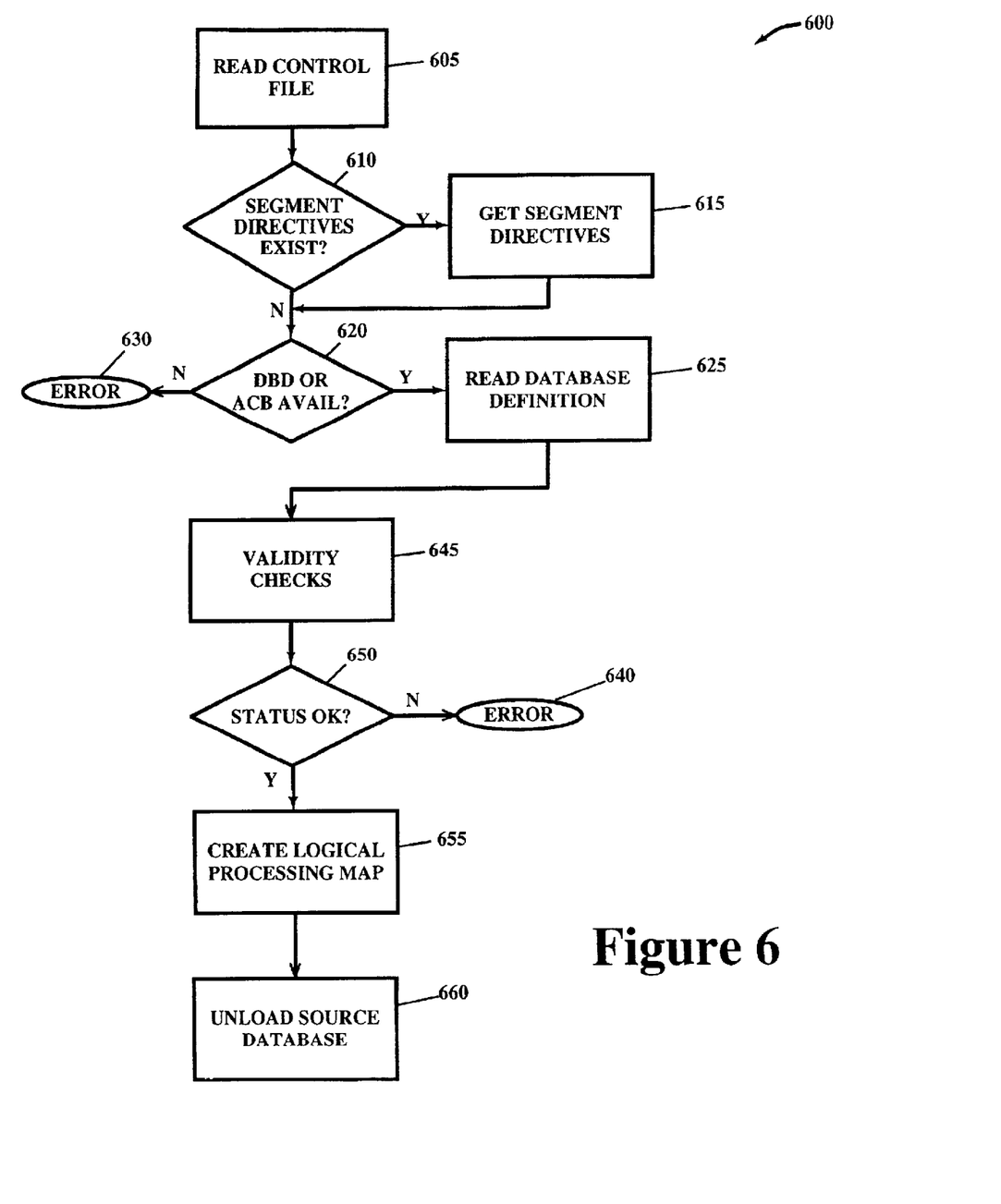
FIG. 6 is a flow diagram illustrating unload processing in accordance with the preferred embodiment of the present invention.

Referring now to FIG. 6, flow diagram 600 illustrates the processing performed by the preferred embodiment of segment specific unload utility 210 wherein various validity checking is performed prior to unloading source IMS database 322. Step 605 reads control file 324 to obtain the global directive and any other segment specific selection criteria information residing therein. In step 610, it is determined if explicit segment directives exist. In one embodiment this is determined by checking control file 324 for an identifier of a segment selection file 326. If an identifier for segment selection file 326 is found, then, in step 615, the segment directives are read from segment selection file 326 and processing continues with step 620. Those of ordinary skill in the art will recognize that segment directives may be made available to segment specific unload utility 210 in other ways. For example, segment directives may be incorporated directly into control file 324.

Returning now to step 610, if an identifier for segment selection file 326 is not found, then processing proceeds with step 620 wherein it is determined if database definition 328 is available by reading, for example, a DBD or ACB. If database definition 328 exists, then in step 625 database definition 328 is read wherein certain information pertaining to the structure and hierarchical organization of the source IMS database 322 is obtained before proceeding to step 645.

Returning now to step 620, if a database definition is not available to segment specific unload utility 210, then, in step 630, processing is terminated with an initialization error.

Proceeding now with step 645, various validity checks are performed to ensure that processing can continue in a manner consistent with the specified options. Those of ordinary skill in the art will recognize that many variations are possible with respect to initialization validity checking. For example, a software engineer may decide to give more flexibility to the user of segment specific unload utility 210 wherein less rigorous validity checking is performed but greater risk of database corruption occurs, with corresponding additional responsibility placed on the user to fully comprehend the processing for a given set of specifications and so intend the subsequent result.

The preferred embodiment performs a consistency check to ensure that specifications in database definition 328 do not conflict with specifications in control file 324 or segment selection file 326 and that processing can proceed in accordance with these specifications in a manner that insures the integrity of target unload file 338. For example, a terminating error condition results if application of the global directive and set of segment directives does not include at least one root segment. Additionally, a terminating error condition results if application of the global directive and set of segment directives includes a segment but does not include the segment's parent. Those of ordinary skill in the art will recognize that additional or different validity checks can be performed during validity processing without departing from the spirit and scope of the present invention.

Continuing with step 650, a determination is made as to whether or not all validity checks have been successful and, if so, processing proceeds with step 655 wherein logical processing map 340 is created, as further explained below in conjunction with FIG. 7. Otherwise, if one or more validity checks have failed, control passes to step 640 wherein an initialization error is generated and the processing otherwise intended to be performed by segment specific unload utility 210 is aborted.

Continuing with step 660, source IMS database 322 is unloaded, as explained in greater detail below in conjunction with FIG. 8. Those of ordinary skill in the art will recognize that it is possible to delay many initialization procedures to the point in time at which unload processing cannot continue further until the omitted initialization processing is performed. This delayed point may, in some circumstances, not occur until after the actual process of unloading segments into target unload file 338 has begun. These and many other variations are possible in performing initialization processing without departing from the spirit and scope of the present invention.

Figure 7:
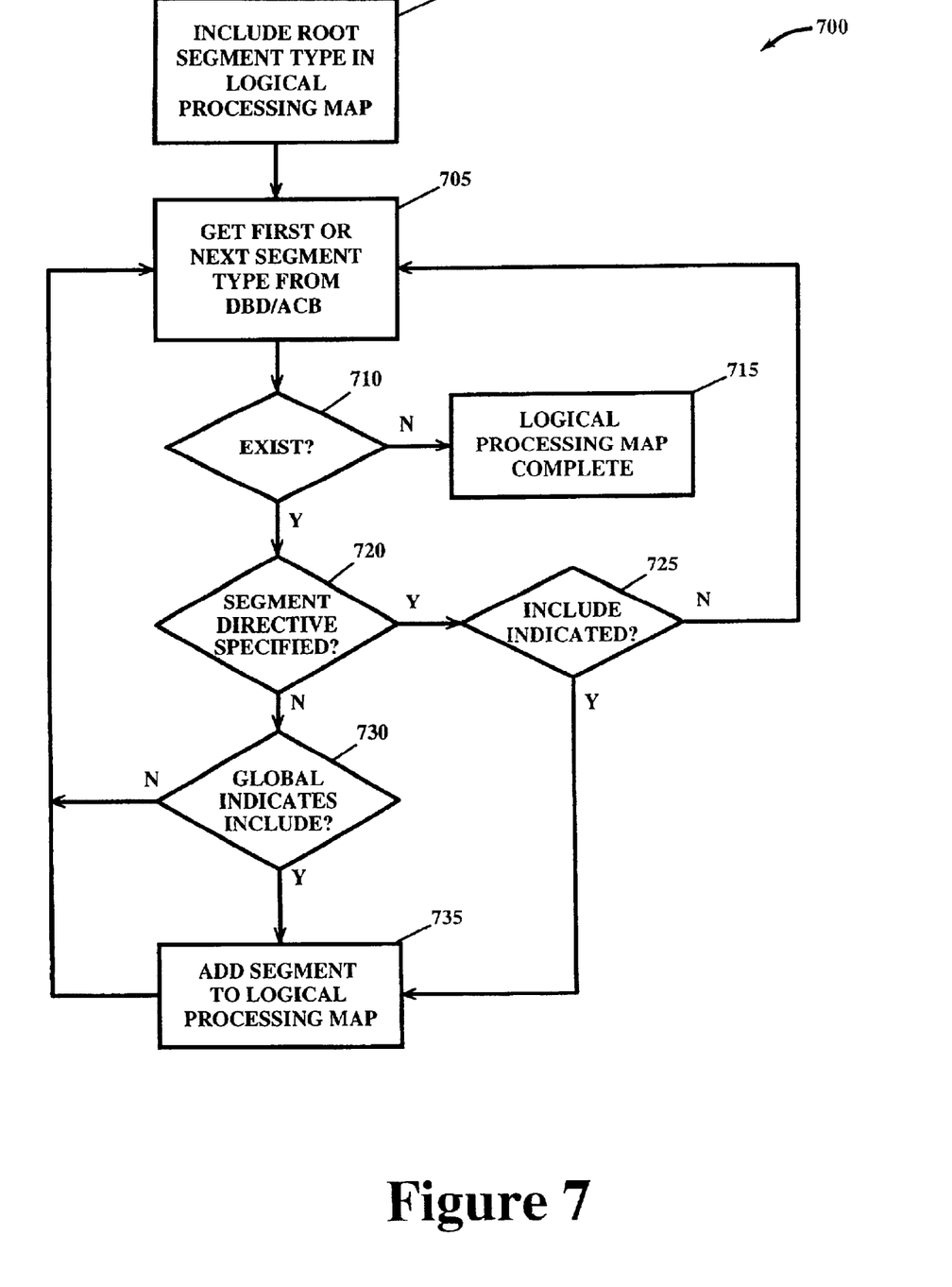
FIG. 7 is a flow diagram illustrating the build of a logical processing map in accordance with the preferred embodiment of the present invention.

Referring now to FIG. 7, flow diagram 700 illustrates additional details of step 655 of FIG. 6 wherein segment specific unload utility 210 creates logical processing map 340. Logical processing map 340 directs the processing of segment specific unload utility 210 by specifying the only segment types that may be included in target unload file 338. Logical processing map 340 is generated from the database definition 328, the global directive residing in control file 324, the set of segment directives residing in segment selection file 326 and the optional inclusive key list residing in control file 324 (the optional inclusive key list is described in greater detail below in conjunction with FIG. 8). Those of ordinary skill in the art will recognize that the format of logical processing map 340 may take a variety of forms. For example, logical processing map 340 may comprise an unordered list, an ordered list, a table, a hash table, an indexed table and the like. Various forms may be considered in order to achieve efficient processing for a particular implementation. Beginning with step 702, the root segment type is automatically included in logical processing map 340 independently of any global or segment directives. Next, in step 705, the first or next segment type from the database definition (DBD or ACB) is retrieved. In step 710 a check is made to determine if the next segment type exists, or if all segment types have been processed. If the next segment type does not exist, then, in step 715 it is determined that all segment types have been processed and, accordingly, logical processing map 340 is complete and unload processing may now proceed. If the next segment type does exist, then, in step 720 a check is made to determine if a segment directive has been specified for this segment type. If so, in step 725 a further check is made to determine if the directive indicates INCLUDE. If so, this segment is added to logical processing map 340 in step 735. Otherwise control returns to step 705 where the next segment type is retrieved, as discussed supra. Returning now to step 720, if a segment directive does not exist for this segment type, then a further check is made in step 730 to determine if a global directive has been specified with the INCLUDE directive. If so, the segment type is added to logical processing map 340 in step 735 and control then returns to step 705 to retrieve the next segment type. Otherwise, control returns to step 705 without adding the segment type to logical processing map 340.

Figure 8:
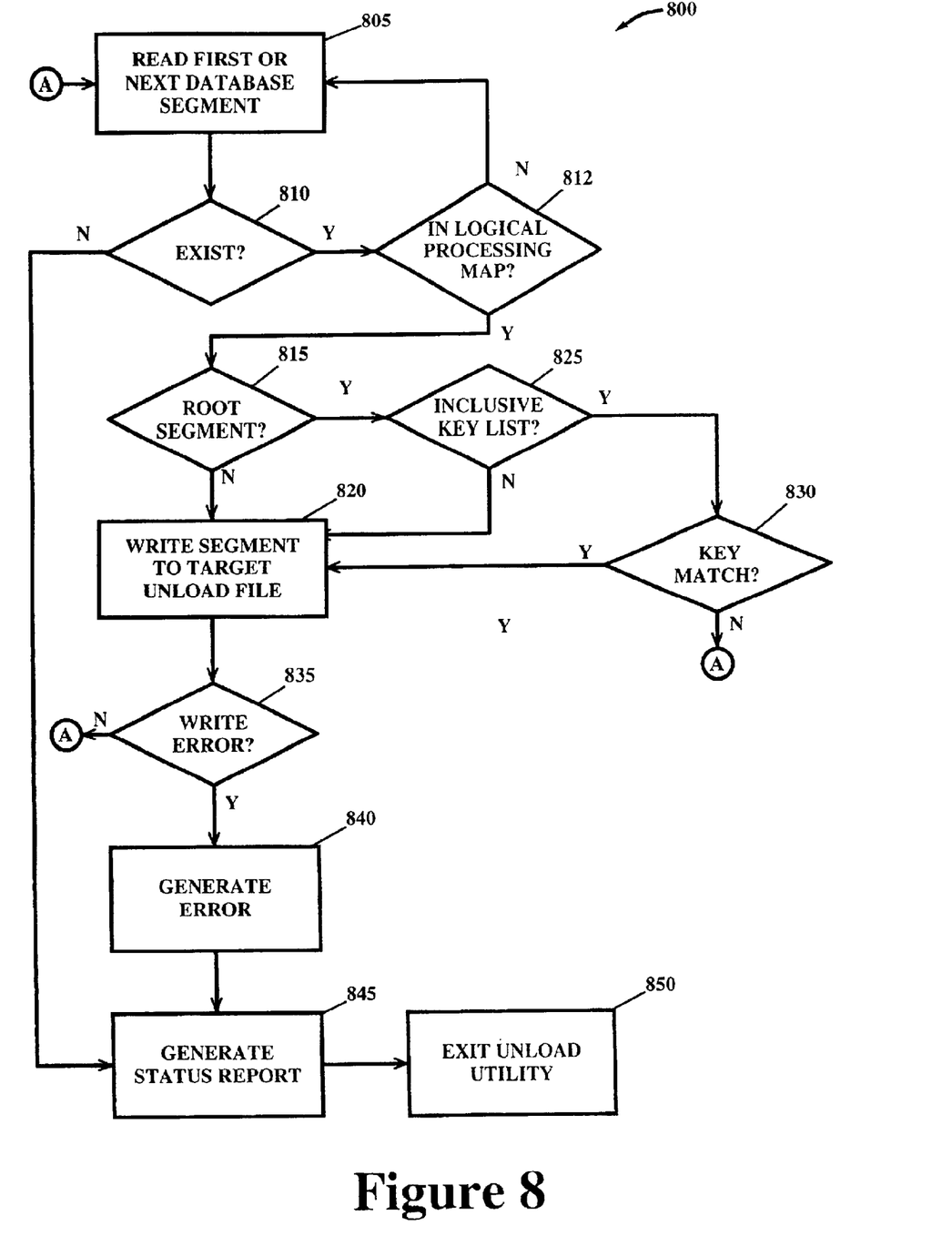
FIG. 8 is a flow diagram illustrating additional processing detail for unload processing in accordance with the one aspect of the preferred embodiment of the present invention.

Referring now to FIG. 8, flow diagram 800 illustrates the additional details of step 660 from flow diagram 600 of FIG. 6 wherein segments are read from source IMS database 322 and written to target unload file 338 in accordance with the segment specific selection criteria provided by the user of segment specific unload utility 210. In step 805 the first or next segment is read from source IMS database 322 in logical sequential order. In step 810, a check is made to determine if the next segment exists, or if all segments have now been processed. If the next segment does not exist, control passes to step 845 where a status report is generated to reflect the completed processing results and then, in step 850, segment specific unload utility 210 exits and returns control to operating system 200.

Otherwise, the next segment does exist and processing proceeds to step 812 where a further check is made to determine if the segment type of this segment is identified by logical processing map 340. If not, control returns to step 805 where the next database segment is read as discussed supra. If so, processing continues with step 815 where a further check is made to determine if the currently read segment is a root segment. If not, this segment is written to target unload file 338 in step 820. Otherwise, the current segment is a root segment and, in step 825, a check is made to determine if an inclusive key list exists.

An inclusive key list (not shown) is specified by the user and comprises a list of root segment keys to be processed. The inclusive key list resides in segment selection file 326; however, in an alternative embodiment, the inclusive key list may reside in control file 324. If an inclusive key list exists, in step 830 a check is made to determine if a key from the inclusive key list matches the key of the current segment. If so, the current segment is written, in step 820, to target unload file 338; otherwise, the current segment is excluded (referred to as an excluded root segment) and processing returns to step 805 where the next segment is read from source IMS database 322, as described supra. Returning now to step 825, if an inclusive key list is not specified, then, in step 820, the current segment is written to target unload file 338.

Proceeding from step 820, a check is made in step 835 to determine if any write errors occurred when writing the current segment to target unload file 338. If so, control passes to step 840 where an error condition is generated and then to step 845 followed by step 850 where a status report is generated and segment specific unload utility 210 exits, thereby returning control back to operating system 200. Otherwise, control returns to step 805 where the next segment is read, as discussed supra.

Taken in combination flow diagrams 600, 700 and 800, shown in FIGS. 6, 7 and 8, respectively, provide for enhanced programmer productivity by enabling segment specific unload processing of a hierarchical database. Utilizing target unload file 338 as a source file for additional operations, a number of advanced database management tasks on a target database may be facilitated without requiring custom written utility programs or custom written utility exit routines. These advanced database management tasks include database merge, database mass insert, database mass update, database replication and other database management tasks where segment selectivity on a source database is required.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A method for performing on a computer system an unload of a hierarchical database utilizing a segment specific selection criteria, comprising the steps of:

receiving said segment specific selection criteria wherein said segment specific selection criteria comprises a global directive and a set of segment directives;

reading a database definition for said hierarchical database;

building a logical processing map utilizing at least said global directive, said set of segment directives and said database definition;

reading a segment from said hierarchical database; and writing said segment to a target unload file if said segment has a type identified by said logical processing map and said segment is not an excluded root segment.

2. The method of claim 1 wherein said segment is not an excluded root segment if said segment specific selection criteria does not comprise an inclusive key list.

3. The method of claim 1 wherein said segment specific selection criteria further comprises an inclusive key list.

4. The method of claim 3 wherein said segment is not an excluded root segment if said segment is a root segment and said root segment contains a key, wherein said key is identified by said inclusive key list.

5. The method of claim 3 wherein said segment is an excluded root segment if said segment is a root segment and said root segment contains a key, wherein said key is not identified by said inclusive key list.

6. The method of claim 1 wherein a control file comprises said global directive and said set of segment directives and wherein said receiving step comprises reading said control file.

7. The method of claim 1 wherein a control file comprises said global directive and an identifier for a segment selection file, and wherein said receiving step comprises reading said control file and said segment selection file.

8. The method of claim 1 wherein said global directive indicates a global bias to either include or exclude segment types from said logical processing map.

9. The method of claim 8 wherein a segment directive selected from said set of segment directives indicates a segment specific action to either include or exclude a segment type from said logical processing map.

10. The method of claim 1 further comprising utilizing said target unload file as a source file to perform on a target database an operation selected from the group consisting of merge, mass update and mass insert.

11. A method for performing an unload operation on a hierarchical database utilizing a segment specific selection criteria, comprising the steps of:

providing said segment specific selection criteria wherein said segment specific selection criteria comprises a global directive and a set of segment directives;

providing the name of a target unload file;

providing the name of said hierarchical database; and invoking a segment specific unload utility wherein said global directive, said set of segment directives, said name of said target unload file and said name of said hierarchical database are made available to said segment specific unload utility, and wherein at least one segment from said hierarchical database is written to said target unload file in accordance with said segment specific selection criteria.

12. An article of manufacture for use in a computer system tangibly embodying computer instructions executable by said computer system to perform process steps for unloading a hierarchical database utilizing a segment specific selection criteria, said process steps comprising:

receiving said segment specific selection criteria wherein said segment specific selection criteria comprises a global directive and a set of segment directives;

reading a database definition for said hierarchical database;

building a logical processing map utilizing at least said global directive, said set of segment directives and said database definition;

reading a segment from said hierarchical database; and writing said segment to a target unload file if said segment has a type identified by said logical processing map and said segment is not an excluded root segment.

13. The article of manufacture according to claim 12 wherein said segment is not an excluded root segment if said segment specific selection criteria does not comprise an inclusive key list.

14. The article of manufacture according to claim 12 wherein said segment specific selection criteria further comprises an inclusive key list.

15. The article of manufacture according to claim 14 wherein said segment is not an excluded root segment if said segment is a root segment and said root segment contains a key, wherein said key is identified by said inclusive key list.

16. The article of manufacture according to claim 14 wherein said segment is an excluded root segment if said segment is a root segment and said root segment contains a key, wherein said key is not identified by said inclusive key list.

17. The article of manufacture according to claim 12 wherein a control file comprises said global directive and said set of segment directives and wherein said receiving step comprises reading said control file.

18. The article of manufacture according to claim 12 wherein a control file comprises said global directive and an identifier for a segment selection file, and wherein said receiving step comprises reading said control file and said segment selection file.

19. The article of manufacture according to claim 12 wherein said global directive indicates a global bias to either include or exclude segment types from said logical processing map.

20. The article of manufacture according to claim 19 wherein a segment directive selected from said set of segment directives indicates a segment specific action to either include or exclude a segment type from said logical processing map.

21. The article of manufacture according to claim 12 further comprising utilizing said target unload file as a source file to perform on a target database an operation selected from the group consisting of merge, mass update and mass insert.

22. A computer system for unloading a hierarchical database utilizing a segment specific selection criteria, said computer system comprising:

a computer;

first computer program instructions for receiving said segment specific selection criteria wherein said segment specific selection criteria comprises a global directive and a set of segment directives;

second computer program instructions for reading a database definition for said hierarchical database;

third computer program instructions for building a logical processing map utilizing at least said global directive, said set of segment directives and said database definition;

fourth computer program instructions for reading a segment from said hierarchical database; and fifth computer program instructions for writing said segment to a target unload file if said segment has a type identified by said logical processing map and said segment is not an excluded root segment.

23. The system of claim 22 wherein said segment is not an excluded root segment if said segment specific selection criteria does not comprise an inclusive key list.

24. The system of claim 22 wherein said segment specific selection criteria further comprises an inclusive key list.

25. The system of claim 24 wherein said segment is not an excluded root segment if said segment is a root segment and said root segment contains a key, wherein said key is identified by said inclusive key list.

26. The system of claim 24 wherein said segment is an excluded root segment if said segment is a root segment and said root segment contains a key, wherein said key is not identified by said inclusive key list.

27. The system of claim 22 wherein a control file comprises said global directive and said set of segment directives, and wherein said receiving step comprises reading said control file.

28. The system of claim 22 wherein a control file comprises said global directive and an identifier for a segment selection file, and wherein said receiving step comprises reading said control file and said segment selection file.

29. The system of claim 22 wherein said global directive indicates a global bias to either include or exclude segment types from said logical processing map.

30. The system of claim 29 wherein a segment directive selected from said set of segment directives indicates a segment specific action to either include or exclude a segment type from said logical processing map.

* * * * *